United States Patent Office 3,265,913
Patented August 9, 1966

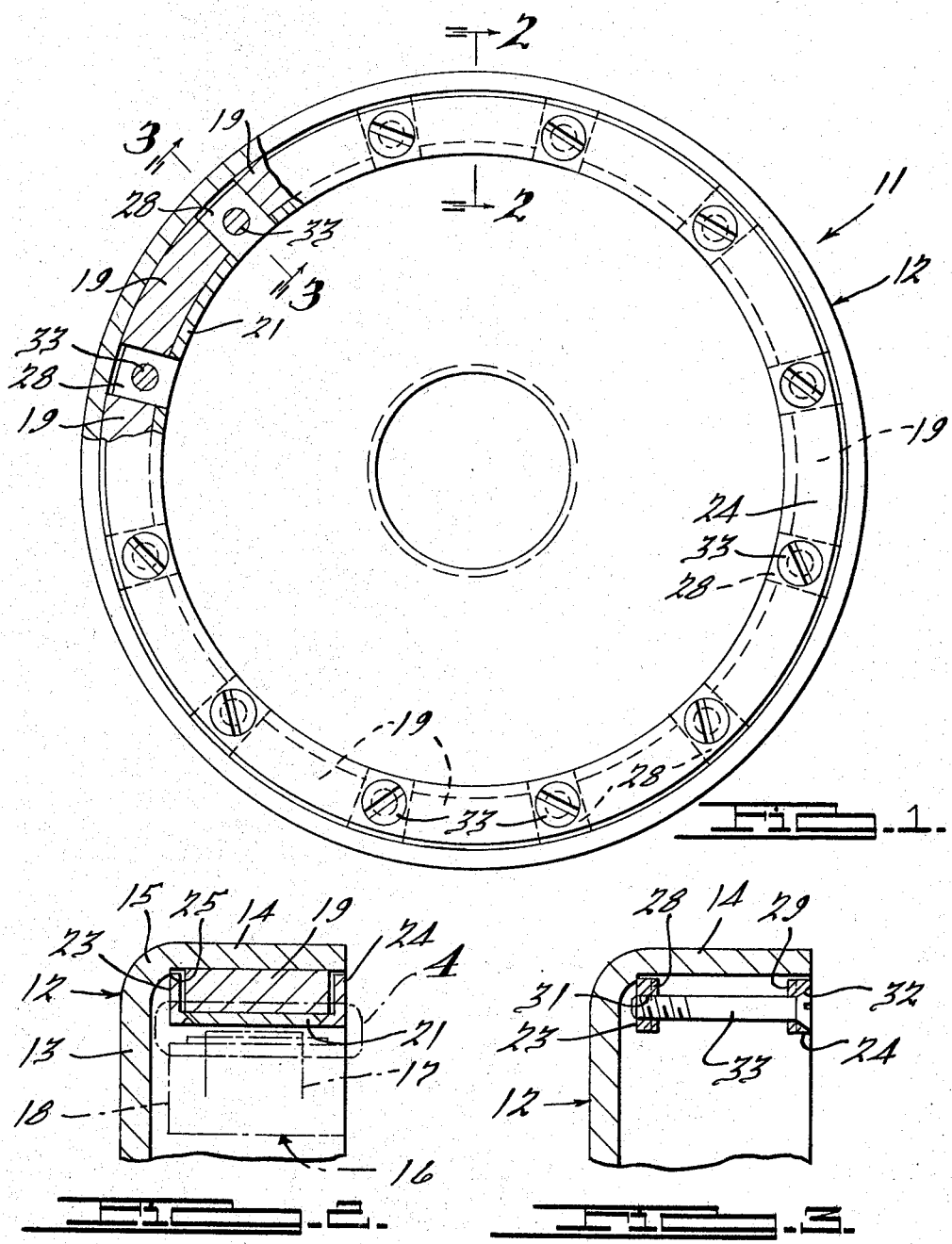

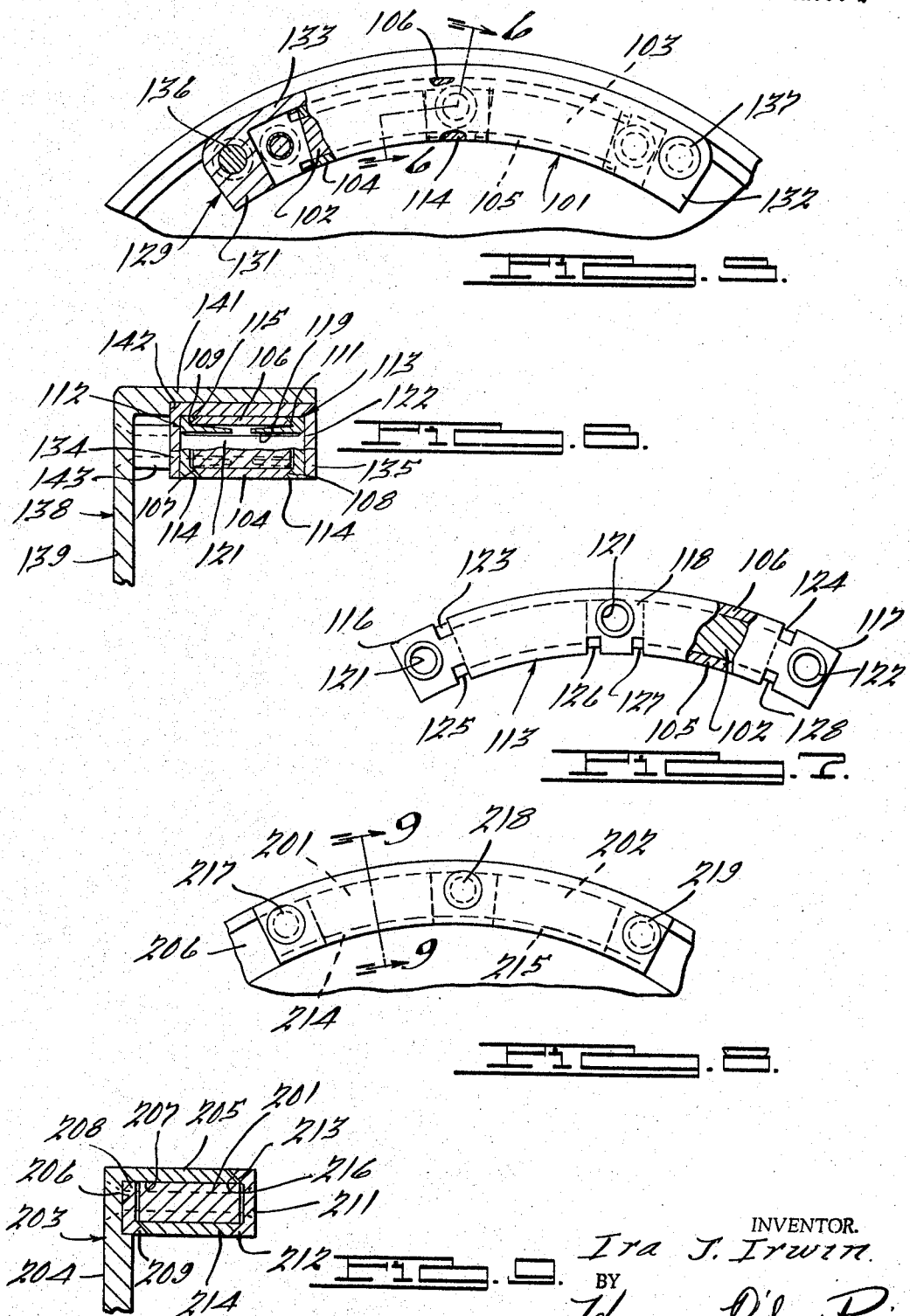

3,265,913
MAGNETIC RETAINING MEANS
Ira J. Irwin, Pontiac, Mich., assignor to Syncro Corporation, Oxford, Mich., a corporation of Michigan
Filed Dec. 5, 1963, Ser. No. 328,355
8 Claims. (Cl. 310—153)

This invention relates to alternators and the like, and more particularly to the portions of such devices which carry permanent magnet elements. This application is a continuation-in-part of my application Serial No. 167,-365, filed January 19, 1962, and entitled Alternator, said application being assigned to the assignee of the present application.

It is an object of the present invention to provide a novel and improved construction for an alternator rotor assembly or the like which carries a plurality of circumferentially spaced magnets and which may act as a flywheel, the invention providing means for retaining the permanent magnets and their associated pole pieces in the annular rotor support ring in a simple and economical manner without the necessity of using a bonding agent.

It is another object to provide an improved magnet assembly construction of this nature which is especially adapted for curved ceramic magnets, and does not require the machining of the magnets or bring any fastening member in direct engagement with the magnet surfaces.

It is a further object to provide an improved magnet assembly construction of the above character which permits maximum exposure of the pole pieces and maximum engagement of the magnet elements with the support ring for flux transmission purposes.

Other objects, features, and advantages of the present invention will become apparent from the subsequent description, taken in conjunction with the accompanying drawings, in which FIGURE 1 is an end elevational view of a rotor constructed in accordance with the present invention, parts being broken away;

FIGURE 2 is a fragmentary cross-sectional view in elevation taken along the line 2—2 of FIGURE 1 and showing the engagement of the clamping rings with a magnet pole piece as well as the relative location of a portion of a stator pole;

FIGURE 3 is a fragmentary cross-sectional view taken along the line 3—3 of FIGURE 1 and showing a clamping ring draw screw passing through the clamping ring shoulders;

FIGURE 4 is an enlarged fragmentary cross-sectional view taken in the area marked 4 of FIGURE 2 and showing the clearance between the clamping ring and magnet;

FIGURE 5 is a fragmentary elevational view, partially cross-sectioned, of a flywheel carrying a modified form of the magnet retaining means;

FIGURE 6 is a cross-sectional view taken along the line 6—6 of FIGURE 5 and showing the manner of clamping the magnets and pole pieces;

FIGURE 7 is a side elevational view of the subassembly of clamping members, support member, magnets and pole pieces;

FIGURE 8 is a fragmentary elevational view of a portion of a flywheel showing a further modification of the magnet retaining means; and FIGURE 9 is a cross-sectional view taken along the line 9—9 of FIGURE 8 and showing the manner of clamping the magnets and pole pieces in the embodiment of FIGURE 8.

In general terms, each of the illustrated embodiments of the invention comprises an annular rotor support ring which may be used as the flywheel of an alternator, and a plurality of curved magnet members circumferentially spaced around the inner surface of the support ring. Each magnet has a curved pole piece engaging its inner surface, and a pair of arcuate or annular clamping members are disposed in axially spaced relation on opposite sides of the magnets and pole pieces. The clamping members have angled protrusions along their inner edges which engage beveled edges on the pole pieces, the clamping members being slightly spaced from the magnets themselves. When the clamping members are drawn together by fasteners passing between the magnets, the protrusions will wedge the pole pieces outwardly, thus forcing the magnets against the inner surface of the support ring, or against an arcuate flux-conducting backup member. In one embodiment of the invention, a mounting member is die cast around two magnets secured in accordance with the invention, and the mounting member is then secured in a rotor ring.

Referring more particularly to the drawings, the assembly of the embodiment of FIGURES 1 to 4 is generally indicated at 11 and comprises a rotatably mounted rotor support ring generally indicated at 12 for an alternator or similar device having a radial wall 13 and an axially extending wall 14 formed integrally with the outer edge of wall 13, a curved section 15 connecting to walls. Wall 14 is of sufficient depth to accommodate a stator indicated partially and generally at 16 which comprises a plurality of poles 17 having coils 18 mounted thereon.

A plurality of magnets 19 are secured to the inner surface of wall 14 in circumferentially spaced relation. Preferably, these magnets have convex outer surfaces and concave inner surfaces concentric with wall 14, one pole of each magnet being adjacent its outer surface and the other pole adjacent its inner surface, the polarity of adjacent magnets being reversed.

A pole piece 21 is provided for each magnet 19, these pole pieces being relatively thin and curved to interfit with the inner surfaces of the magnets. The surface of each pole piece 21 engaging its magnet has the same width as the magnet in an axial direction, but the side edges 22 of the pole pieces are beveled inwardly toward each other from the magnet width, as seen in FIGURES 2 and 4.

An inner clamping ring 23 and an outer ring 24 are disposed on opposite sides of magnets 19 and pole pieces 21. Inner clamping 23 is adapted to engage a shoulder 25 formed on the inner surface of curved portion 15 of support ring 12. Both rings 23 and 24 have inwardly directed protrusions 26 and 27 respectively. These protrusions have annular sloping surfaces engageable with beveled edges 22 of pole pieces 21, and the depth of the protrusions relative to the inner diameter of rings 23 and 24 is such that when the protrusions engage beveled edges 22, rings 23 and 24 will be slightly spaced from magnets 19. Preferably, the outer diameter of rings 23 and 24 is only slightly less than the inner diameter of wall portion 14, so that when the rings are drawn together, as later described, there will be no tendency to shift the magnets to one side or the other of the support ring.

A plurality of circumferentially spaced shoulders 28 and 29 are formed on the facing surfaces of rings 23 and 24 respectively.

The width of these shoulders is such that when magnets 19 and pole pieces 21 are placed between rings 23 and 24, they will be held in properly spaced-apart relation by the shoulders, as seen in FIGURE 1.

A threaded aperture 31 is formed in each shoulder 28, this aperture passing through ring 23. A plurality of countersunk apertures 32 are formed in ring 24, these apertures passing through shoulders 29 and being aligned with apertures 31. A plurality of draw screws 33 are provided, the heads of these screws being receivable by apertures 32, and the threaded ends engageable with apertures 31.

In assembling unit 11, clamping ring 23 will first be placed within support ring 14 in engagement with shoulder 25, and with protrusion 26 extending toward the open end of ring 12. For assembly purposes, wall 13 of ring 12 may be laid flat on a table. Magnets 19 and their associated pole pieces 21 will then be placed between shoulders 28 on ring 23, and clamping ring 24 inserted in support ring 12. The latter ring will be inserted in such a manner that its shoulders 29 will be disposed between magnets 19 and pole pieces 21.

The clamping ring draw screws 33 may then be inserted through apertures 32 and screwed into tapped holes 31. As draw screws 33 are tightened, the angled protrusions 26 and 27 of rings 23 and 24 will engage the beveled edges 22 on pole pieces 21, thus forcing the pole pieces and their magnets radially outwardly against the inner surface of support ring wall 14. During this movement, the facing surfaces of rings 23 and 24 will remain slightly spaced from magnets 19, and the close spacing between the outer edges of rings 23 and 24 and the inner surface of support ring wall 14 will prevent appreciable shifting of the magnets to any one portion of ring 12.

The frictional forces exerted by magnets 19 on ring 12 due to the wedging action of rings 23 and 24 will be sufficient to hold the entire assembly, comprising the magnets, pole pieces, clamping rings and screws, firmly within support ring 12 without any additional securing means being required. If desired in certain applications, however, additional securing strength could be obtained by applying a strong glue or other bonding agent between magnets 19 and their pole pieces 21, and on the surfaces of magnets 19 which engage the internal surface of wall 14. Such a bonding agent would be applied just prior to assembly.

FIGURES 5, 6 and 7 show another embodiment of the invention which is generally indicated at 101 and includes two arcuate magnets 102 and 103 with arcuate pole pieces 104 and 105 respectively on their inner surfaces. An arcuate support member 106 extends along and engages the outer surfaces of both magnets 102 and 103, and also connects them, thus serving as a flux-conductive path, the magnets having radially oriented poles of alternate polarity.

The arcuate edges of pole pieces 104 and 105 as well as support member 106 are beveled in the same manner as side edges 22 of pole pieces 21 in the previous embodiment. That is, the edges 107 and 108 of pole pieces 104 and 105 are beveled inwardly toward each other from the magnet width, and the edges 109 and 111 of backup member 106 are beveled outwardly toward each other from the magnet width, as seen in FIGURE 6.

A pair of clamping members generally indicated at 112 and 113 are provided, these clamping members being of identical construction. A clamping member is shown in FIGURE 7 and is of arcuate shape extending radially the width of a pole piece, magnet and the backup member 106. The inner edges 114 of members 112 and 113 have protruding surfaces complementary to and adapted to engage beveled edges 107 and 108 of pole pieces 104 and 105. The outer edges 115 of members 112 and 113 have protruding surfaces complementary to and adapted to engage edges 109 and 111 of support member 106.

A pair of extensions 116 and 117 are provided on each clamping member 112 and 113, and these extensions, as well as central portion 118 of each clamping member, are provided with fastener-receiving clearance apertures 119. These apertures may have inwardly extending tubular portions as seen in FIGURE 6, and fasteners 121 in the form of tubular members are adapted to be received by apertures 119, the ends 122 of fasteners 121 being peened outwardly after insertion to draw clamping members 112 and 113 toward each other.

Members 112 and 113 are also provided with a pair of locating indentations 123 and 124 at the opposite ends of edge 115 for properly positioning support member 106, and four indentations 125, 126, 127 and 128 at their lower edges 114 for locating magnets 102 and 103 and pole pieces 104 and 105. Indentations 125 to 128 are so located as to position the magnets and their corresponding pole pieces on opposite sides of central aperture 119.

Unit 101 may be assembled by placing a pair of clamping members 112 and 113 on opposite sides of the pair of magnets 102 and 103 with their pole pieces 104 and 105 and a support member 106, with beveled edges 107 and 108 of the pole pieces being engaged by edges 114 of the clamping members and beveled edges 109 and 111 of the support member being engaged by edges 115 of the clamping members. Three fasteners 121 may then be inserted in apertures 119, and their outer edges peened outwardly so as to draw together clamping members 112 and 113. This will wedge pole pieces 104 and 105 as well as support member 106 tightly against magnets 102 and 103, clamping all the mmebers together. As in the previous embodiment, the facing surfaces of clamping members 112 and 113 will remain slightly spaced from magnets 102 and 103. The wedging action of the clamping members on the pole pieces and backup member will thus create a firmly secured assembly.

An arcuately shaped die cast mounting member generally indicated at 129 may be formed around the subassembly described above, forming the complete assembly 101. Member 129 may be fabricated of a nonmagnetizable material, such as aluminum, with a pair of outer portions 131 and 132 extending circumferentially past the ends of clamping member extensions 116 and 117 respectively. Member 129 also has a portion 133 extending radially outwardly of and overlapping support member 106, and side walls 134 and 135 overlapping clamping members 112 and 113 respectively, as seen in FIGURE 6. Member 129 will leave exposed the inwardly facing surfaces of pole pieces 104 and 105.

A pair of fasteners 136 and 137, such as rivets, may be used to secure assembly 101 to a flywheel or rotor support ring generally indicated at 138. This ring has a radial portion 139 and a cylindrical portion 141 extending to one side thereof, a shoulder 142 being provided adjacent the juncture of these two portions. The inner surface of portion 141 is provided with the same curvature as the outer surface of portion 133 of member 129, and the total width of member 129 between the outer surfaces of its walls 134 and 135 is equal to the distance from shoulder 142 to the outer edge of rotor 141. Fasteners 136 and 137 may pass through portions 131 and 132 of member 129 and also through radial wall 139 of rotor 138, spacers 143 being provided on the fasteners between assembly 101 and wall 139.

A construction of the type shown in FIGURES 5 to 7 could be used for internal rotors, that is, rotors which are inside their stators, by reversing the positions of the pole pieces and support plate, and changing the shape of member 129 accordingly.

FIGURES 8 and 9 show a further embodiment of the invention in which two magnets 201 and 202 with radially oriented poles of alternate polarity engage the inner surface of the cylindrical portion of a rotor generally indicated at 203 having a radial portion 204 and a cylindrical magnet supporting portion 205 extending to one side thereof. This rotor has a recess 206 at the outer portion of radial wall 204, the inner surface 207 of wall 205 being contiguous with the outer wall of this recess, as seen in FIGURE 9. An inner clamping member 208 is disposed within this recess, member 208 being of arcuate shape and having an outwardly beveled inner edge 209. An outer clamping member 211 is also provided, this member being of arcuate shape and having an outwardly beveled protruding inner edge 212 and an inwardly beveled protruding outer edge 213. Edges 209 and 212 are adapted to engage pole pieces 214 and 215 which are provided for magnets 201 and 202 respectively, whereas edge 213 is adapted to engage an outwardly beveled edge 216 on wall 205 of support ring 203.

The radial width of outer clamping member 211 is approximately equal to the combined radial thickness of wall 205, magnet 201 or 202 and pole piece 214 or 215, whereas the width of inner clamping member 208 is approximately equal to the combined thickness of magnet 201 or 202 and pole piece 214 or 215.

When inner clamping member 208 is placed in recess 206 and magnets 201 and 202 as well as pole pieces 214 and 215 are placed in the position shown in FIGURES 8 and 9, outer clamping member 211 may be placed in the position shown in these figures and drawn toward clamping member 208 by fasteners 217, 218 and 219. These fasteners may be in the form of rivets having heads which are disposed in countersunk holes in the radial wall 204 of support ring 203 and in outer clamping member 211, so that when the heads of the rivets are expanded, clamping member 211 will be drawn towards clamping member 208 and edges 209 and 212 of the clamping member will tend to force the pole pieces and magnets radially outwardly against the inner surface of support ring wall 205. Edge 213 of clamp 211 will engage edge 216 of wall 205, thereby securing the assembled parts in position on the support ring and counteracting the force on clamp 211 created by the coaction of edge 212 with the pole pieces. Rivets 217 and 219 are located outwardly of magnets 201 and 202 respectively, whereas rivet 218 is located between them. In this embodiment, as in the first embodiment, the outer surfaces of magnets 201 and 202 will be in tight contact with support ring 12 which will act as a flux-conductive member.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an alternator assembly, a support ring having an annular cylindrical wall, a plurality of magnet assemblies in circumferentially spaced relation on said wall and having surfaces engaging the wall and concentric therewith, a pair of clamping rings in axially spaced relation on opposite sides of said magnet assemblies and concentric with said wall, means for drawing said clamping rings axially toward each other, said means comprising a plurality of fasteners extending axially between adjacent magnet assemblies, said fasteners being individually adjustable to draw said clamping rings toward each other, and facing protrusions on said clamping rings engaging the opposite sides of said magnet assemblies, said facing protrusions having a wedging action with respect to said magnet assemblies, whereby said magnet assemblies are firmly secured by frictional engagement with said support ring wall.

2. The combination according to claim 1, said protrusions being of annular configuration and having inclined surfaces engageable with said magnet assemblies, the inner surfaces of said magnet assemblies being of arcuate concave shape concentric with said protrusions.

3. In a rotor construction for alternators or the like, a support ring having a cylindrical inner surface, a plurality of circumferentially spaced curved magnets engageable with said inner surface, said magnets having convex outer surfaces and concave inner surfaces concentric with said inner ring surface, a plurality of pole pieces engageable with said inner magnet surfaces, said pole pieces being substantially thinner in a radial direction than said magnets and having convex outer surfaces and concave inner surfaces concentric with said magnet surfaces, the inner surfaces of said pole pieces having side edges beveled toward each other, a pair of clamping rings on opposite sides of said magnets and pole pieces, the diameter of said clamping rings being only slightly less than the diameter of said inner ring surface, beveled annular protrusions at the inner edges of said clamping rings engageable with the beveled side edges of said pole pieces, circumferentially spaced shoulders on said clamping rings disposed between said magnets and pole pieces, and draw screws extending through said shoulders and between said clamping rings and adapted to draw the clamping rings toward each other, whereby said pole pieces and the magnets will be wedged radially outwardly to cause the magnets to be frictionally secured between said inner ring surface and said pole pieces, the dimensions of the parts being such that said clamping rings will remain slightly spaced from said magnets when drawn together by said draw screws.

4. In a dynamoelectric machine flywheel assembly, an arcuate support member having a surface forming at least a portion of a cylinder, a plurality of magnet assemblies in circumferentially spaced relation on said support member surface and having first arcuate surfaces complementary to and engaging said support member surface and second arcuate surfaces facing away from said support member, a pair of clamping members in axially spaced relation on opposite sides of said magnet assemblies, individually adjustable fasteners drawing said clamping members axially toward each other, a first set of facing protrusions on said clamping members engaging opposite side edges of said second arcuate magnet assembly surfaces, and a second set of facing protrusions on said clamping members engaging the opposite sides of said support member, said first set of facing protrusions wedging said magnet assemblies radially into frictional engagement with said support member in response to drawing together of said clamping members by said fasteners, said second set of facing protrusions wedging said support member radially into frictional engagement with said magnet assemblies in response to drawing together of said clamping members by said fasteners, thereby counteracting said first-mentioned wedging action.

5. The combination according to claim 4, further provided with an arcuate mounting member surrounding said support member and clamping members and extending outwardly at opposite ends of said clamping members but leaving exposed said second arcuate magnet assembly surfaces, a rotor ring, and a pair of fasteners extending through those portions of the mounting member which extend outwardly from the ends of said clamping members and securing said mounting member to said rotor ring.

6. The combination according to claim 4, said clamping members being further provided with circumferentially spaced indentations for positioning said magnet assemblies.

7. In a dynamoelectric machine flywheel assembly, a rotor ring having a radial wall and an outer cylindrical wall extending to one side thereof, a recess at the outer portion of said radial wall facing in the direction of extent of said cylindrical wall, a plurality of arcuate magnets having radially oriented poles engaging the inner surface of said cylindrical wall outwardly of said recess, a pair of arcuate pole pieces engaging the inner surfaces of said magnets, a first clamping member of arcuate shape fitting within said recess, and a second clamping member of arcuate shape at the outer end of said cylindrical wall, said first clamping member having a radial width approximately equal to the combined radial thickness of said magnets and pole pieces, said second clamping member having a radial width approximately equal to the combined radial thickness of said cylindrical wall, magnets and pole pieces, protrusions on the inner edges of said clamping members engaging the adjacent edges of said pole pieces, a protrusion on the outer edge of said second clamping member engaging the adjacent edge of said cylindrical rotor ring wall, and a plurality of fasteners extending through said clamping members and circumferentially spaced from said magnets, said protrusions being formed with an inclination and responsive to drawing together of said clamping members by said fasteners to wedge said pole pieces and said cylindrical wall radially into frictional engagement with said magnet.

8. In a dynamoelectric machine flywheel assembly, a pair of magnet assemblies comprising two circumferentially spaced arcuate magnets and a pair of pole pieces interfitting with corresponding arcuate surfaces on said magnets, a single flux-conductive arcuate support member engaging the other arcuate surfaces of said magnets and extending therebetween, a pair of arcuate clamping members on opposite sides of said magnets, pole pieces and support member, said clamping members having a width in a radial direction approximately equal to the combined radial thickness of said magnets, pole pieces and support member, indentations on said clamping members for locating said magnets, pole pieces and support members in a circumferential direction, said support members extending circumferentially past said magnets on opposite ends thereof, facing protrusions with wedge-shaped surfaces on the inner and outer edges of said support members engaging the side edges of said pole pieces and support member, said side edges having complementary wedge-shaped surfaces, and fasteners extending between said clamping members at their extensions thereof and between said magnets, said protrusions wedging said pole pieces and support member radially into frictional engagement with said magnet assemblies in response to the drawing together of said clamping members by said fasteners.

References Cited by the Examiner

UNITED STATES PATENTS

| | | | |
|---|---|---|---|
| 1,472,710 | 10/1923 | Wilson | 192—76 |
| 2,806,156 | 9/1957 | Phelon | 310—153 X |
| 3,009,747 | 11/1961 | Pitzer | 287—52.9 X |

FOREIGN PATENTS 908,689   10/1962   Great Britain.

MILTON O. HIRSHFIELD, *Primary Examiner.*
ORIS L. RADER, *Examiner.*
J. J. SWARTZ, *Assistant Examiner.*